(12) United States Patent
Messer et al.

(10) Patent No.: US 10,645,902 B1
(45) Date of Patent: May 12, 2020

(54) STALL PLOW

(71) Applicant: Messer Repair and Fabricating, LLC., Sauk Centre, MN (US)

(72) Inventors: Nathan R. Messer, Sauk Centre, MN (US); Daniel J. Brunko, Sauk Centre, MN (US)

( * ) Notice: Subject to any disclaimer, the term of this patent is extended or adjusted under 35 U.S.C. 154(b) by 231 days.

(21) Appl. No.: 15/653,447

(22) Filed: Jul. 18, 2017

Related U.S. Application Data

(60) Provisional application No. 62/363,816, filed on Jul. 18, 2016.

(51) Int. Cl.
| | | |
|---|---|---|
| A01D 78/00 | (2006.01) | |
| A01D 78/10 | (2006.01) | |
| A01K 1/01 | (2006.01) | |
| A01K 1/015 | (2006.01) | |
| B65G 65/30 | (2006.01) | |
| E02F 3/34 | (2006.01) | |
| E02F 3/65 | (2006.01) | |

(52) U.S. Cl.
CPC ............ *A01K 1/0132* (2013.01); *A01K 1/015* (2013.01); *B65G 65/30* (2013.01); *E02F 3/3414* (2013.01); *E02F 3/652* (2013.01)

(58) Field of Classification Search
CPC ........ A01K 1/01; A01K 1/0128; A01K 1/015; A01K 1/0132; A01K 1/037; B08B 9/08; E01C 19/15; E02F 3/962; E02F 3/961; E02F 3/3414; E02F 3/652; B65G 65/30
USPC ............. 37/104, 105; 56/367; 15/93.1, 93.3; 172/23, 25, 610; 404/96
See application file for complete search history.

(56) References Cited

U.S. PATENT DOCUMENTS

| | | |
|---|---|---|
| 1,333,504 A | 3/1920 | Monroe |
| 1,507,552 A | 9/1924 | Adams et al. |
| 1,594,972 A | 8/1926 | Mautz |
| 1,843,260 A | 2/1932 | Arnold et al. |
| 2,453,723 A | 11/1948 | Palmer et al. |
| 2,556,508 A | 6/1951 | Preston |
| 3,231,991 A | 2/1966 | Evert et al. |
| 3,548,956 A | 12/1970 | Hochstetler |
| 3,605,167 A | 9/1971 | Martel et al. |
| 3,657,828 A | 4/1972 | Anderson |
| 3,662,420 A | 5/1972 | Jordar |

(Continued)

FOREIGN PATENT DOCUMENTS

EP 2220931 A1 8/2010

*Primary Examiner* — Robert E Pezzuto
(74) *Attorney, Agent, or Firm* — Albert W. Watkins

(57) ABSTRACT

A stall plow removably attaches to a prior art skid steer using available quick connect couplers. The stall plow has a moldboard that is configured to completely remove waste bedding from a livestock free stall from the area adjacent to the curb and deliver it to the alley, where a prior art machine can then complete removal of the waste bedding from the alley. The moldboard includes a primary scraper section and side cutter that scrapes and lifts waste bedding up and over the curb. A curb section and curb flange then shift the bedding over to the alley and drop waste bedding into the alley, where a discharge spreader levels and distributes the waste. An extensible arm and hydraulic extension cylinder adjusts the moldboard transversely relative to direction of travel. An angle and pitch adjuster sets the moldboard for a particular free stall geometry and bedding material composition.

7 Claims, 7 Drawing Sheets

(56) References Cited

U.S. PATENT DOCUMENTS

| | | | |
|---|---|---|---|
| 3,802,392 A | 4/1974 | Andersen | |
| 3,845,516 A | 11/1974 | Abbott et al. | |
| 3,845,517 A | 11/1974 | Harris | |
| 4,068,726 A | 1/1978 | Heitman | |
| 4,109,336 A | 8/1978 | Ford | |
| 4,372,617 A | 2/1983 | Zamboni | |
| 4,837,940 A * | 6/1989 | Mahan | E02F 3/765 172/239 |
| 5,377,766 A * | 1/1995 | Klinger | E01C 19/15 172/382 |
| 6,446,298 B1 | 9/2002 | Berg, Jr. et al. | |
| 6,854,528 B2 * | 2/2005 | Dowdy | A01B 33/065 172/817 |
| 6,951,253 B1 | 10/2005 | Linsmeier | |
| 7,401,575 B2 | 7/2008 | Waybright | |
| 7,624,520 B2 * | 12/2009 | Gordon | E02F 3/841 172/815 |
| 8,393,040 B2 | 3/2013 | Linsmeier | |
| 8,561,324 B1 | 10/2013 | Kersten | |

* cited by examiner

STALL PLOW

CROSS REFERENCE TO RELATED APPLICATIONS

The present application claims the benefit of U.S. provisional patent application 62/363,816 filed Jul. 18, 2016 of like title and having at least one inventor in common, the teachings and entire contents which are incorporated herein by reference.

BACKGROUND OF THE INVENTION

1. Field of the Invention

This invention pertains generally to the field of animal husbandry, and more particularly to an apparatus greatly facilitating the cleaning of livestock stalls.

2. Description of the Related Art

Livestock stalls are used within barns to meet many diverse needs. Among these needs are feeding mangers, milking stalls, and resting stalls. For exemplary purposes in the dairy industry, commonly there are a number of stalls in rows, sometimes referred to as free stalls, that provide a clean, dry and comfortable place for the cows to lie down and rest. Each stall is defined by shaped pipes on the sides referred to as stall partitions. An alleyway or the like separates every one or more typically every other row of stalls. On the stall side of the curb, and generally at an elevation comparable with the top of the curb, various types of materials may be used as flooring or bedding. Most commonly sand or gravel is used, but alternatively straw, wood shavings, sawdust, paper, composted or separated and treated manure, and other materials of little other value, but which nevertheless are useful in providing a relatively better and cleanable surface for the livestock. Free stalls are well known in the industry, but for exemplary purpose U.S. Pat. No. 3,802,392 by Andersen, entitled "Livestock stall divider structure" may be consulted, the teachings which are incorporated herein by reference.

The alleys, which may be grooved, are quite accessible and provide a path both for the livestock and also for machinery and persons to move about. These alleys are typically bordered adjacent to the stalls by a curb that separates the two. The alley may be rapidly cleaned either with automated machinery designed for the task, or with small scrapers or front end loaders such as the well-known skid steers. Exemplary U.S. and Foreign patents and published applications that illustrate manure scrapers, the teachings which are incorporated herein by reference, include: U.S. Pat. No. 3,548,956 by Hochstetler, entitled "Scraper attachment for garden tractors"; U.S. Pat. No. 3,662,420 by Jordar, entitled "Machine for removing chicken waste"; U.S. Pat. No. 3,845,516 by Abbot et al, entitled "Litter removal mechanism for poultry houses and the like"; U.S. Pat. No. 6,446,298 by Berg et al, entitled "Scraper for animal stalls"; and U.S. Pat. No. 7,401,575 by Waybright, entitled "System, apparatus and method for removing large animal waste from a floor".

While the stalls are often designed to encourage the livestock to drop excrements outside of the stall, such as within the alleyways, there will nevertheless be a certain amount of milk, urine, and manure that will be dropped within the stall. Once again, most barns are arranged such that this excrement will be close to the alley if dropped in the stall, meaning that the area most closely adjacent to the curb will need cleaning at appropriate intervals. With deep sand beds, the recommended cleaning interval for complete removal of this sand is approximately six months.

Unlike the alleyways, there is very little room or clearance between the curb and the stall dividers. Consequently, there is not enough space to permit a skid steer to be used to replace the bedding in this area. Instead, these spaces are typically cleaned by manual labor, such as with a shovel. As may be appreciated, this requires significant time which may be better spent on other more profitable or beneficial activities. Recognizing the deficiencies of the prior art, a number of artisans have sought better apparatus to reduce the burden and time required to maintain the free stall bed. Exemplary U.S. and Foreign patents and published applications that illustrate these more mechanized approaches, the teachings which are incorporated herein by reference, include: U.S. Pat. No. 3,605,167 by Martel et al, entitled "Wing gutter cleaner"; U.S. Pat. No. 3,845,517 by Harris, entitled "Scraper attachment"; U.S. Pat. No. 6,951,253 by Linsmeier, entitled "Animal bedding groomer"; U.S. Pat. No. 8,393,040 by Linsmeier, entitled "Animal bedding removal apparatus"; U.S. Pat. No. 8,561,324 by Kersten, entitled "Combination livestock bedding leveler and groomer attachment"; and EP 2,220,931 by Schreyoegg, entitled "Device for grooming lie-down stalls in a stable". Unfortunately, the curb that divides the free stall from the alley presents an obstacle to the easy removal of bedding material. As a result, most of the machines that have been devised for the maintenance of free stalls simply scrape above or nearly adjacent to the top of the curb, including the Linsmeier, Kersten, and Schreyoegg machines. These provide much easier daily or weekly grooming, but fail to assist with complete bedding removal required on the semi-annual intervals. The Martel et al and Harris documents also fail to address this need.

As may be apparent, in spite of the enormous advancements and substantial research and development that has been conducted, there still remains a need for a machine adapted to completely remove free stall bedding material in the vicinity of the curb that separates the free stall from the alley.

Additional patents generally illustrating other plows and graders of varying relevance, the relevant teachings and contents which are incorporated herein by reference, include: U.S. Pat. No. 1,333,504 by Monroe, entitled "Roadgrader"; U.S. Pat. No. 1,507,552 by Adams et al, entitled "Ditch Forming Grader"; U.S. Pat. No. 1,594,972 by Mautz, entitled "Shoulder-trimming machine"; U.S. Pat. No. 1,843,260 by Arnold et al, entitled "Attachment for road graders"; U.S. Pat. No. 2,453,723 by Palmer et al, entitled "Ditcher"; U.S. Pat. No. 2,556,508 by Preston, entitled "Ditching attachment for grader blades"; U.S. Pat. No. 3,231,991 by Evert et al, entitled "Snow ridge scraper"; U.S. Pat. No. 3,657,828 by Anderson, entitled "Scraper snowplow with pivotal dozer blade"; U.S. Pat. No. 4,068,726 by Heitman, entitled "Ground-moving equipment"; U.S. Pat. No. 4,109,336 by Ford, entitled "Automated machinery to clean debris from roadside ditches, collect it and then transport the debris to a major collecting area for disposing"; and U.S. Pat. No. 4,372,617 by Zamboni, entitled "Ice edger for ice resurfacing machine".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is in combination, a free style barn, skid steer and a stall plow. The free style barn comprises a stall floor having a plurality of livestock stall partitions anchored thereto; a curb separating the stall floor from an alley; and stall bedding distributed across the stall floor at least adjacent to the livestock stall partitions. The skid steer comprises a set of drive wheels; and a skid steer quick connect coupler. The stall plow comprises a stall plow quick connect coupler coupled to the skid steer quick connect coupler, and a moldboard. The moldboard has a primary scraper section having a bottom scraper edge that is adapted to scrape and lift stall bedding from the stall floor. A moldboard curb section is coupled with and extends from the primary scraper section and has a curb bottom edge vertically displaced above the bottom scraper edge and curb, and is adapted to receive stall bedding from the primary scraper and shift the stall bedding over the curb. A discharge spreader is coupled with and extends from the curb section and has a lower edge displaced above the alley, and is configured to receive stall bedding from the curb section and drop and distribute the stall bedding into the alley.

In a second manifestation, the invention is a stall plow. The stall plow has a skid steer universal coupling configured to couple with a skid steer quick connect coupler. A moldboard is configured to span from contact with a bedding material within a free stall to an alley adjacent to and separated from the free stall by a curb. An extensible arm couples the moldboard to the skid steer universal coupling. An angle and pitch adjuster couples the extensible arm to the moldboard and is configured to vary both an angle and pitch of the moldboard relative to the free stall.

In a third manifestation, the invention is a stall plow moldboard. The stall plow moldboard has a primary scraper section having a bottom scraper edge. The primary scraper section is adapted to scrape and lift stall bedding from a stall floor. A curb section is coupled with and extends from the primary scraper section and has a curb bottom edge vertically displaced above the bottom scraper edge. The curb section is adapted to operate in a position vertically displaced above a free stall curb and receive stall bedding from the primary scraper and shift the stall bedding over the free stall curb. A discharge spreader is coupled with and extends from the curb section and has a lower edge displaced above the alley. The discharge spreader is configured to receive stall bedding from the curb section and drop and distribute the stall bedding into the alley.

OBJECTS OF THE INVENTION

Exemplary embodiments of the present invention solve inadequacies of the prior art by providing a stall plow having a moldboard that includes a primary scraper section, a side cutter, a curb section, a curb flange, and a discharge spreader. The primary scraper section and side cutter efficiently scrapes and lifts waste bedding up and over the curb. The curb section and flange then shift the bedding over to the alley and drop the waste bedding into the alley, where the discharge spreader operates to level and distribute the waste. Once the stall plow has removed the waste bedding from the free stalls, a prior art plow or loader can then efficiently remove the waste bedding from the alley.

The stall plow in accord with the present invention is removably attached to a standard prior art skid steer using the available quick connect couplers. The moldboard may be adjusted transversely relative to the direction of travel using an extensible arm and hydraulic extension cylinder. In addition, an angle and pitch adjuster is provided to allow an operator to set the angle and pitch required for a particular combination of free stall and bedding material.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a stall plow having a moldboard that efficiently scrapes and lifts waste bedding up and over a curb and into the alley. A second object of the invention is to simultaneously level and distribute the waste within the alley, to facilitate subsequent removal by a prior art plow or loader. Another object of the present invention is to removably attach the stall plow to a standard prior art skid steer using the available quick connect couplers. A further object of the invention is to facilitate adjustment of the moldboard transversely relative to the direction of travel using an extensible arm and hydraulic extension cylinder, allowing the operator to carefully and precisely control the position while controlling and operating the skid steer. Yet another object of the present invention is to provide an angle and pitch adjuster that allows an operator to set the angle and pitch required for a particular combination of free stall and bedding material.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
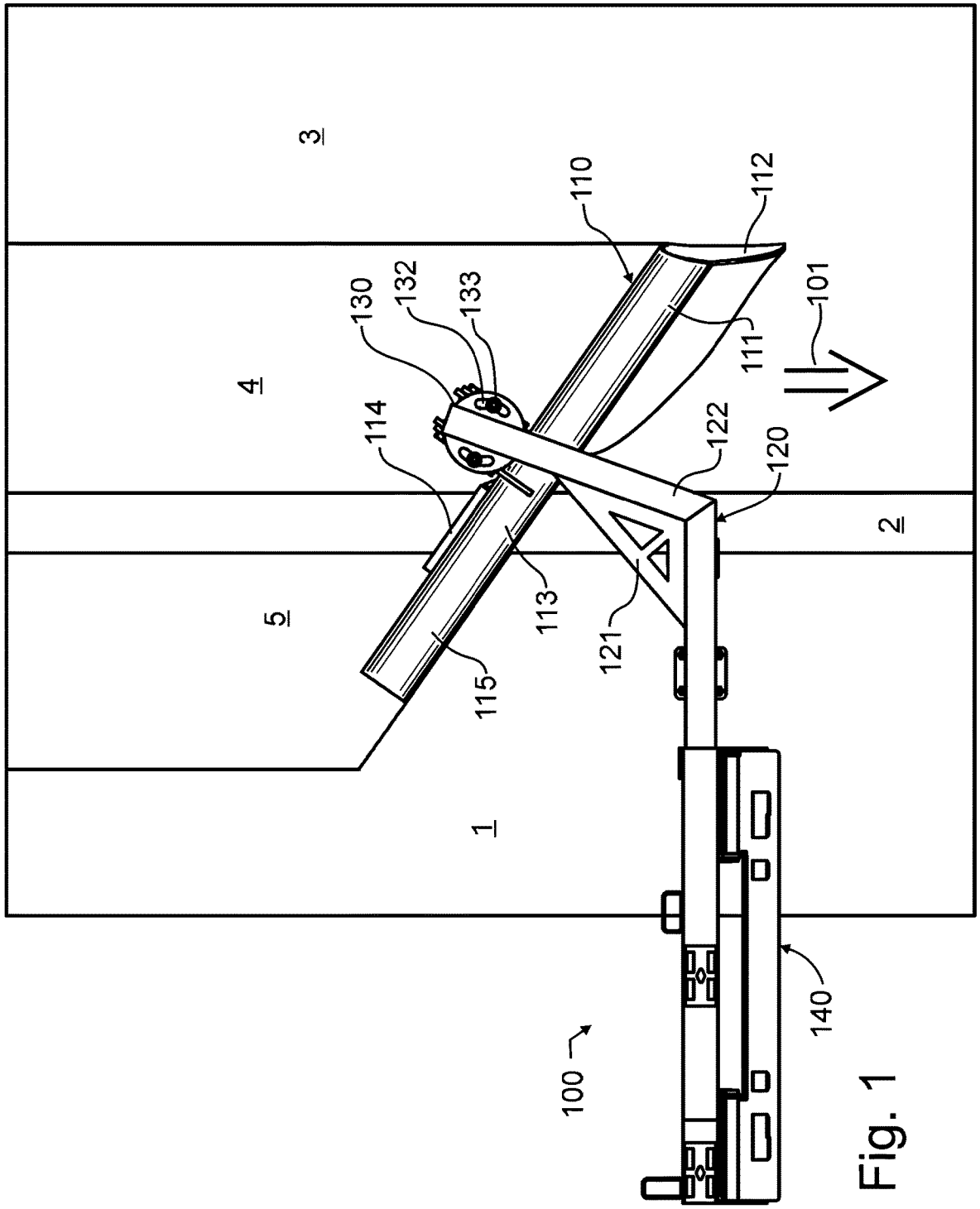
FIGS. 1-4 illustrate a preferred embodiment stall plow designed in accord with the teachings of the present invention and in further combination with an exemplary barn, from top plan view, front isometric view, right side elevational view, and front elevational view, respectively.
Figure 2:
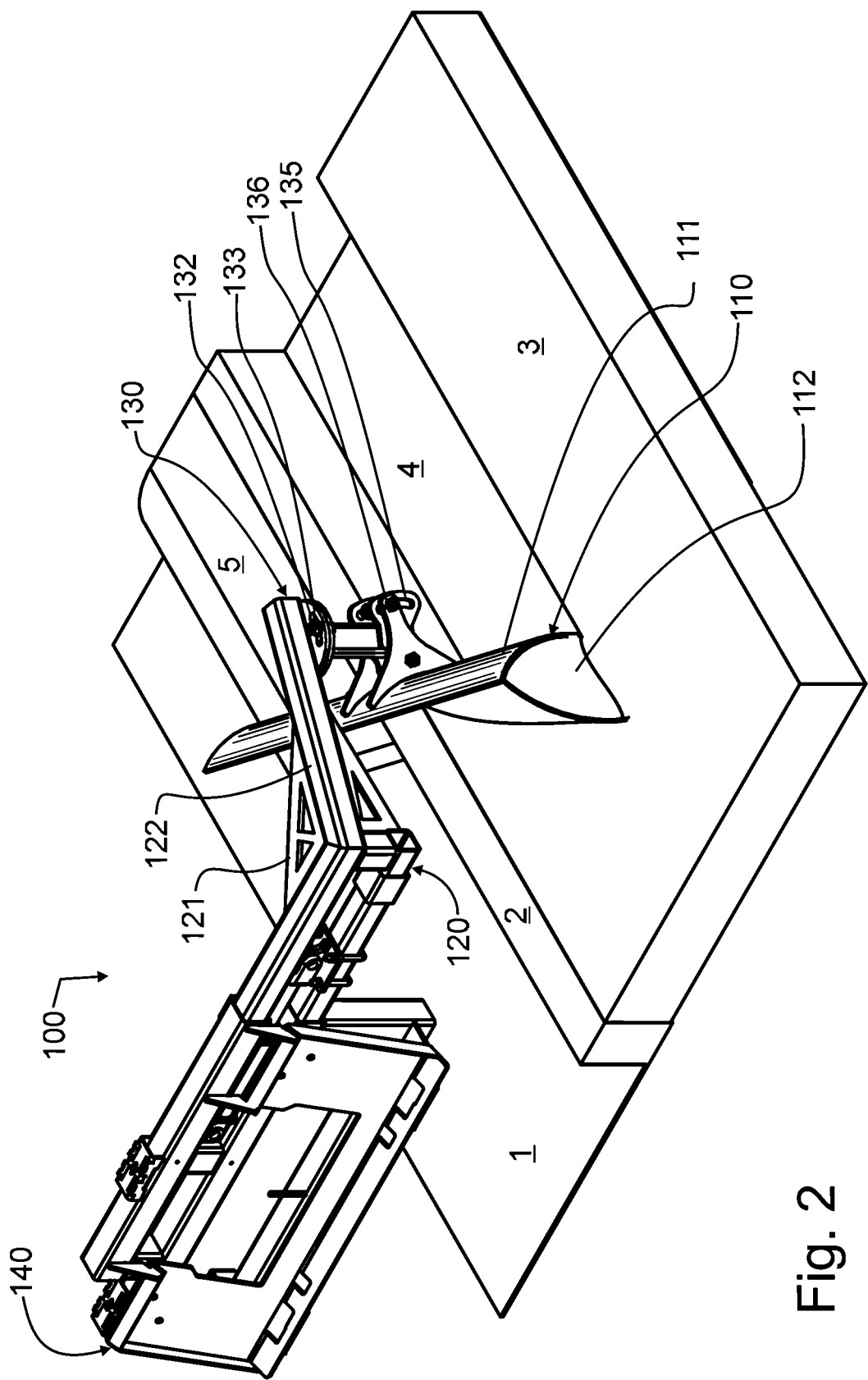
Figure 3:
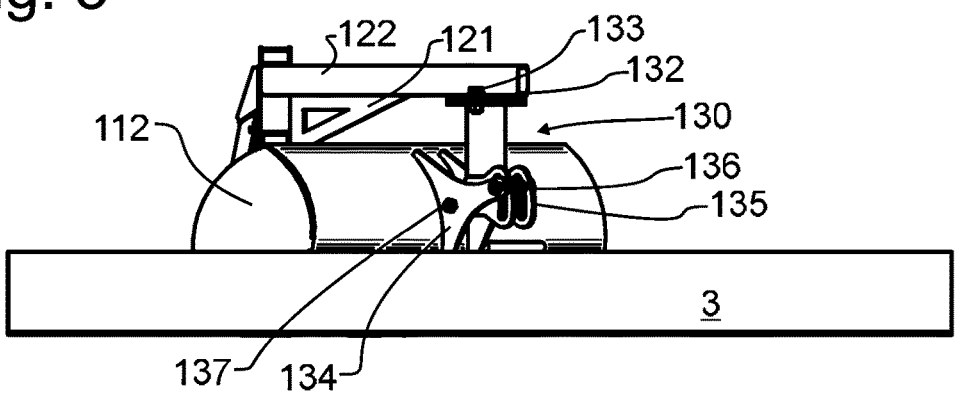

In a typical prior art free stall barn as shown in simplified form in FIGS. 1-4, one or more alleys 1 are provided that allow cattle or other livestock, persons, and machinery to pass. A curb 2 defines the boundary between alley 1 and stall bedding 3.

In a preferred embodiment of the invention illustrated in FIGS. 1-4, a stall plow 100 is comprised of a moldboard 110, an extensible arm 120, an angle and pitch adjuster 130, and a skid steer universal coupling 140. Skid steer universal coupling 140 is configured to couple to a variety of makes and models of skid steers, but it will be understood herein that any specific type of coupler may also be provided to accommodate one particular skid steer. Whether universal or specific to a particular make or model, skid steer coupling 140 will preferably enable a person to rapidly connect and disconnect preferred embodiment stall plow 100 from a skid steer, while also when connected securely holding preferred embodiment stall plow 100 to the skid steer.

When in operation, preferred embodiment stall plow 100 is configured to be pulled by the skid steer in the direction illustrated by arrow 101 in FIG. 1. When operated in this manner, stall bedding 3 may be removed from stall floor 4. The removed bedding 5 is carried by moldboard 110 over the top of curb 2 and is dropped into alley 1.

Moldboard 110 has a primary scraper section 111 that is preferably configured to drop into contact with stall floor 4, to lift and displace stall bedding 3. A side cutter 112 serves to simultaneously provide a clean and sharp line in bedding 3, and to also guide any removed bedding 5 back into contact with primary scraper section 111, preventing the formation of a ridge of removed bedding along the boundary between stall bedding 3 and stall floor 4. Owing to the obtuse angle formed between the direction of travel 101 and the movement of removed bedding 5 along the longitudinal axis of moldboard 110, removed bedding 5 will be lifted by primary scraper section 111 and will be pushed toward curb 2. Curb section 113 will continue to guide removed bedding 5 over the top of curb 2, and will then drop onto alley 1. Curb flange 114 is provided so that, in the event of contact between curb 2 and moldboard 100, there will be minimal destructive force there between. In addition, curb flange 114 will help to provide a sort of seal with curb 2, to facilitate desired removal of stall bedding. The bottom of discharge spreader 115 is preferably at or near the same elevation as the top plane of curb 2, and so is preferably elevated above the plane of alley 1. This allows removed bedding 5 that has passed over the top of curb 2 to drop into alley 1, but still be dropped therein at an elevation about at or slightly below that of curb 2. This helps to facilitate removal of removed bedding 5 from alley 1, by reducing the likelihood that machinery used for that purpose will inadvertently push this bedding back over curb 2 into the free stall.

While moldboard 100 has been illustrated with one particular geometry, it is noted herein that other suitable geometries may be used. For exemplary purposes only, and not solely limiting the invention thereto, discharge spreader 115 has a bottom edge parallel to but vertically displaced from the bottom edge of primary scraper section 111. However, discharge spreader 115 may in an alternative embodiment have a bottom edge that is curved or even irregular, to further shape the discharge of removed bedding 5. This may be done for any suitable reason, but for exemplary and non-limiting purpose, it may be desirable to keep the level of removed bedding 5 lower immediately adjacent to curb 2 while allowing the level to rise higher when displaced farther therefrom.

Extensible arm 120 supports moldboard 110 in the appropriate position relative to curb 2. A frame 122 may be provided with any suitable variety of frame reinforcements 121 to ensure sufficient strength within extensible arm 120. When a driver moves a skid steer equipped with preferred embodiment stall plow 100 next to curb 2, they will first elevate preferred embodiment stall plow 100 above curb 2, and then make sure that extensible arm 120 is extended sufficiently that curb flange 114 will approximately align with curb 2. Next, they will use the skid steer front end loader controls to lower preferred embodiment stall plow 100 down so that either primary scraper section 111 comes into contact with stall floor 4, or curb flange 114 comes into contact with curb 2, whichever occurs first. Then the operator will simply back up the skid steer, which will cause the stall bedding 3 to be plowed up and over curb 2 and into alley 1.

In some cases, the driver may not be able to maintain the spacing between the skid steer and curb 2. To handle this situation, a hydraulic extension cylinder 123 is affixed at one end directly to skid steer universal coupling 140, and coupled to hydraulic line 9. Cylinder ram head 124 is coupled through a clamp or other suitable coupler 125 to extensible arm 120, and may thereby be controlled through the flow of pressurized hydraulic fluid received from skid steer 8 to extend or retract extensible arm 120 from skid steer universal coupling 140 to meet the needs of the driver. Since the driver is facing preferred embodiment stall plow 100, the driver may also then readily ascertain whether any adjustments need to be made to hydraulic extension cylinder 123.

Figure 4:
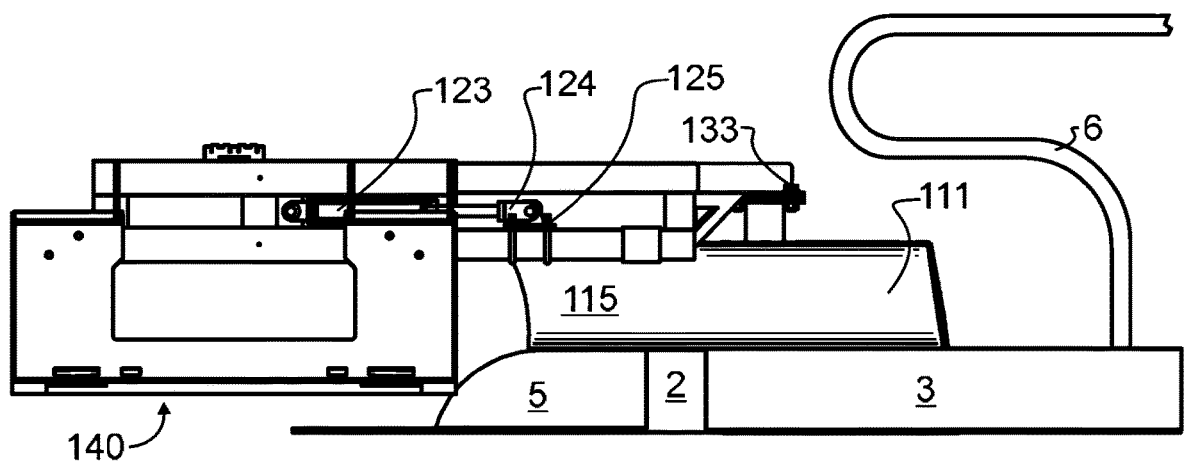
Figure 5:
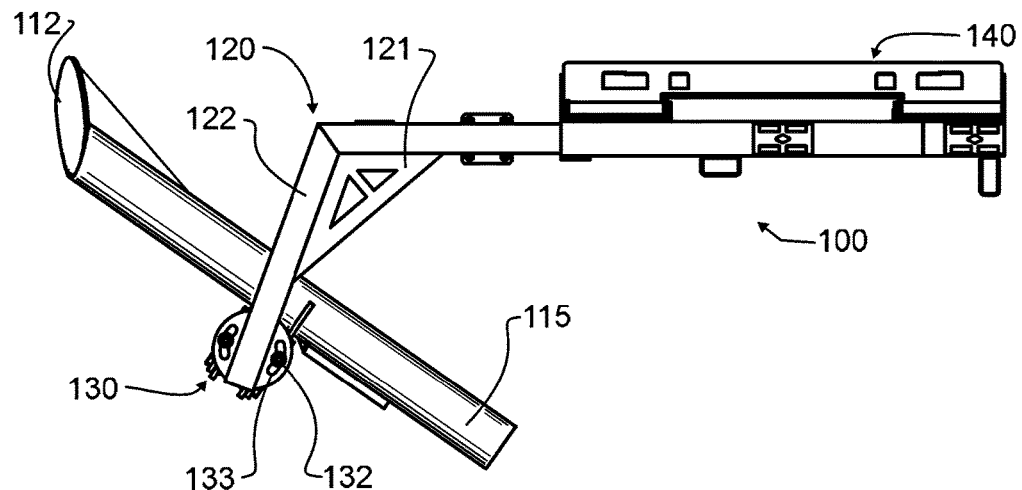
FIGS. 5-8 illustrate the preferred embodiment stall plow of FIGS. 1-4 from top plan view, left side elevational view, rear isometric view, and rear elevational view, respectively.
Figure 6:
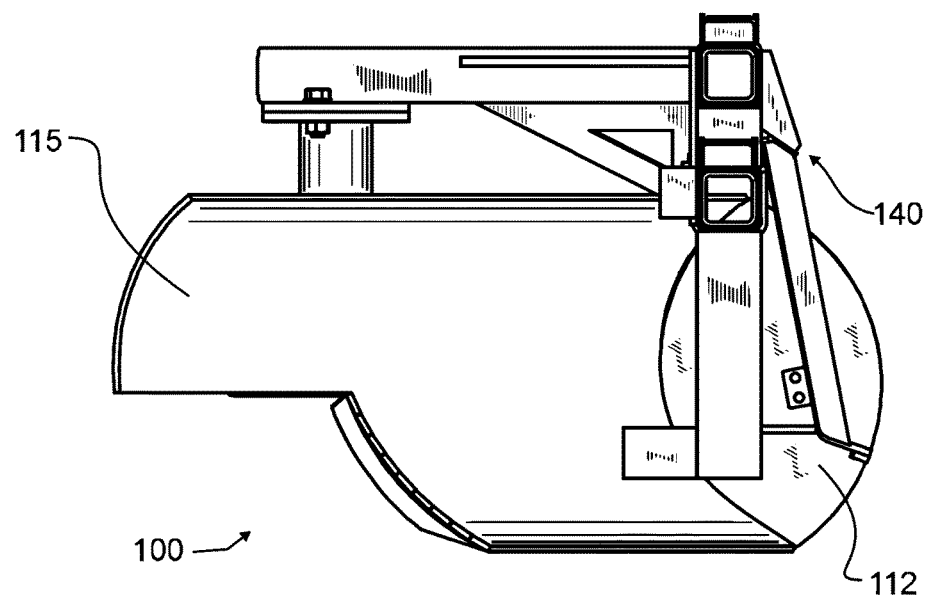
Figure 7:
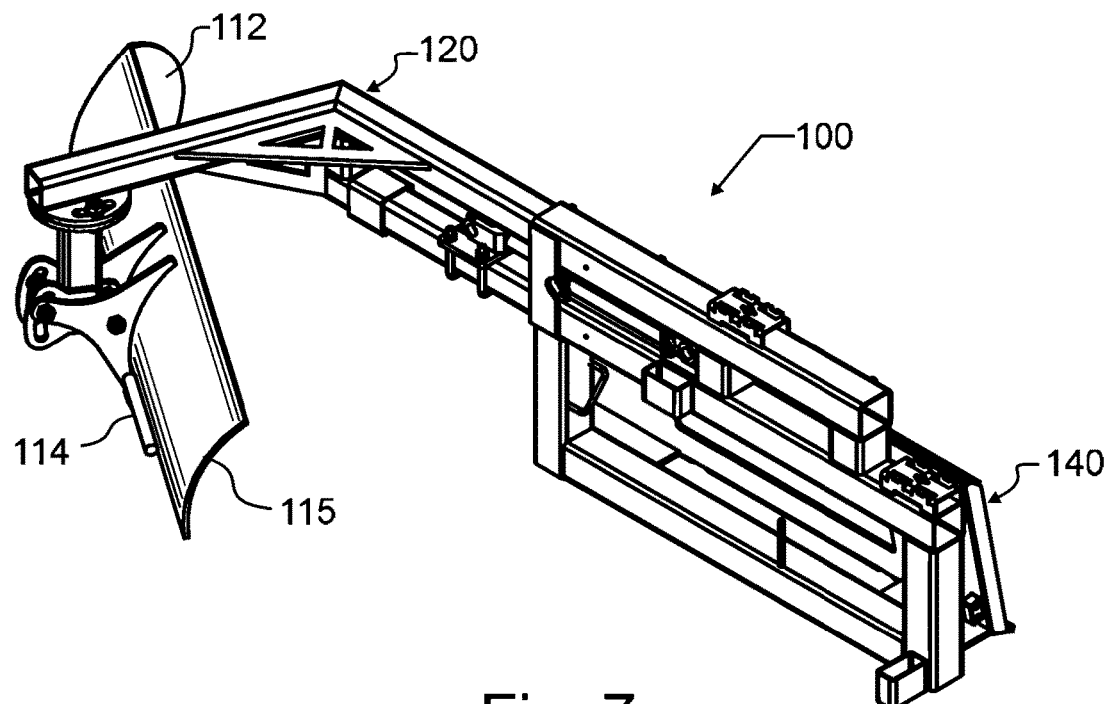
Figure 8:
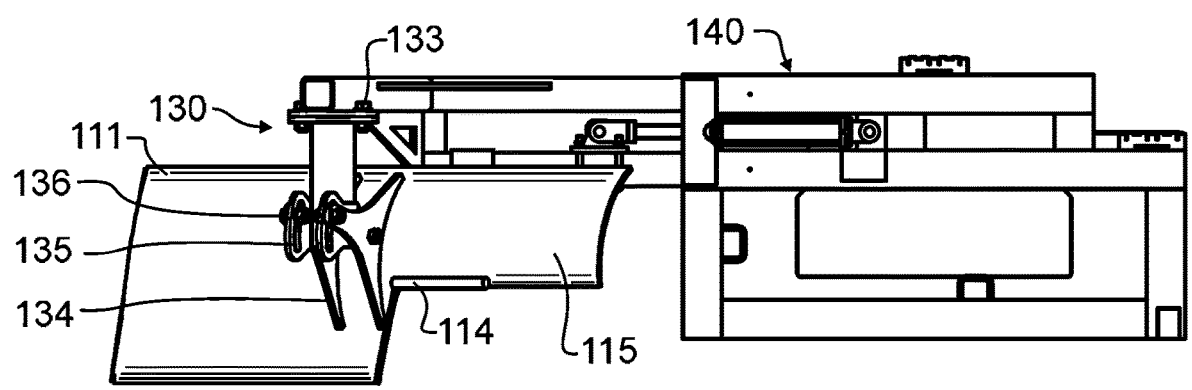

When a driver is removing stall bedding 3, the speed of travel may depend upon an individual driver's skill level and experience, the condition and type of bedding, and the like. As a result, it is most preferred to provide moldboard 110 with adjustments to meet the needs of a particular barn or operator. Angle and pitch adjuster 130 is used to achieve this objective, by providing mechanical pivots in two axes, one for angle and the other for pitch. Rotary pivotal plates 132 provide moldboard angle adjustment, which will control the climb of removed bedding 5 and the effort required to pull preferred embodiment stall plow 100 through stall bedding 3. A more obtuse angle between stall plow 100 and direction of travel 101 will reduce the force required, and reduce the climb of removed bedding 5 vertically on moldboard 110, but will also reduce the reach of moldboard 110 under stall partitions 6, as best illustrated in FIG. 4.

To set the angle, moldboard angle fastener 133 is first loosened, and then the lower of pivotal plates 132 is rotated relative to the upper to the appropriate angle, and then moldboard angle fastener 133 is again tightened to secure the rotary pivotal plates 132 together at a particular angular orientation. This locks the angular orientation of the moldboard relative to skid steer.

While in preferred embodiment stall plow 100 arcuate slots are illustrated within rotary pivotal plates 132 through which moldboard angle fasteners 133 pass, in alternative embodiments other types of mechanical adjustment may be provided. For exemplary and non-limiting purpose, a plurality of discrete holes may be provided within one or both of the lower and upper rotary pivotal plates 132. In such case, a pin may be used that passes through a selected hole in each plate, and the selection of the particular holes will then be used to control the angle. In such case, the pin may be a headed pin further retained on the side of rotary pivotal plates 132 opposite the head with a cotter pin or the like to ensure that the pin stays in place. In a further alternative embodiment, a spring pin or the like may instead be used to pass through the holes in both of the lower and upper rotary pivotal plates 132 to lock the plates together.

The pitch of moldboard 110 determines how easily stall bedding 3 is lifted from stall floor 4, with again a more obtuse angle between the direction of travel and the direction of lifting bedding assisting with the lift. However, as this angle increases, removed bedding 5 will also climb vertically further up toward the top of moldboard 110, which limits how much pitch is permissible before the removed bedding 5 will spill over the top of moldboard 110. Moldboard mounting arms 134 are securely affixed to moldboard 110, and are pivotal about moldboard pitch pivot 137. To set a particular amount of pitch, a moldboard pitch fastener 136 passes through moldboard pitch grooves 135, and when tightened, locks the pitch angle. Like the arcuate grooves in rotary pivotal plates 132, moldboard pitch grooves 135 may be replaced by a plurality of discrete holes.

While preferred embodiment stall plow 100 is illustrated with mechanical adjustments of pitch and angle that are changed by releasing a fastener or pin, adjusting the moldboard, and then securing the fastener or pin, it will be understood herein that other techniques, including but not limited to hydraulic and electrical positioning drives and cylinders, solenoids, and controls, may be provided in alternative embodiments.

FIGS. 5-8 illustrate the preferred embodiment stall plow 100 of FIGS. 1-4 separate from the barn. This provides a better view of side cutter 112, which was partially concealed by stall bedding 3 in FIGS. 1-4, and also a better view of the geometry of curb flange 114 and discharge spreader 115.

FIGS. 9-12 illustrate the preferred embodiment stall plow of FIGS. 1-4 with the blade rotated to a straight or parallel configuration, rather than the angled configuration of FIGS. 1-8. This illustrates the adjustability of the angle between moldboard 110 and direction of travel 101.

Figure 9:
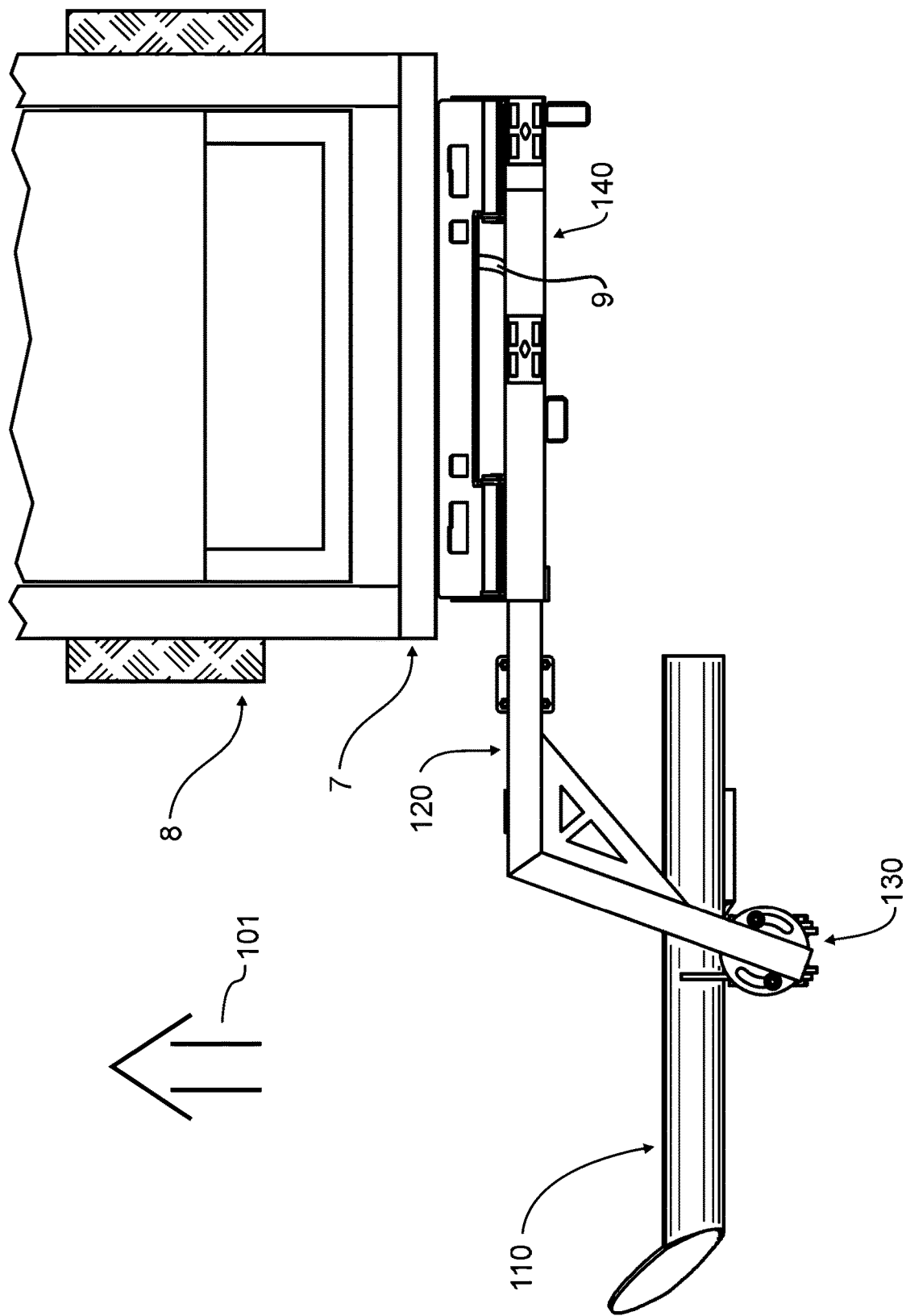
FIG. 9 illustrates the preferred embodiment stall plow of FIGS. 1-8 in further combination with a prior art skid steer from a top plan view.
Figure 10:
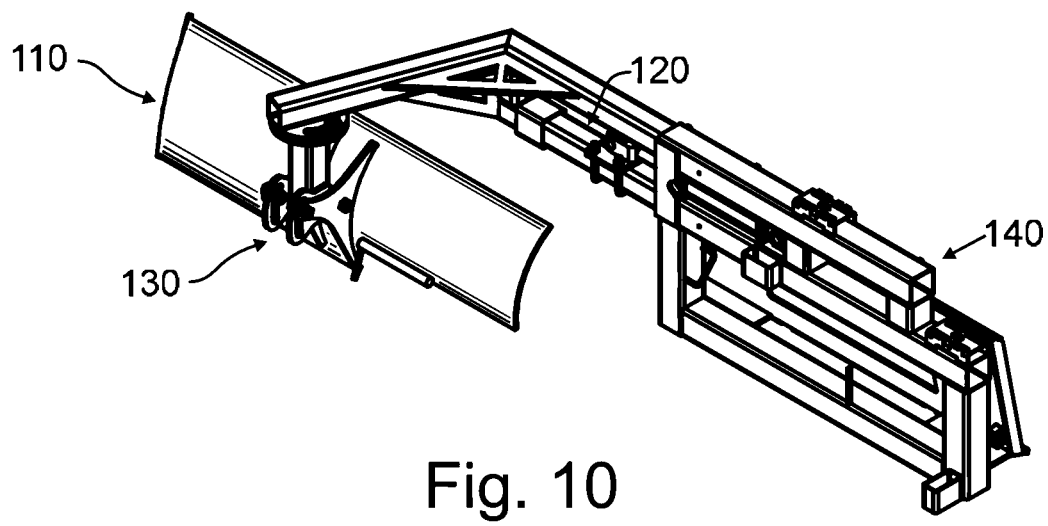
FIGS. 10-12 illustrate the preferred embodiment stall plow of FIGS. 1-9 from rear isometric, left side elevational view, and rear views, respectively, but with the blade rotated to a straight or parallel configuration, rather than the angled configuration of FIGS. 1-9.
Figure 11:
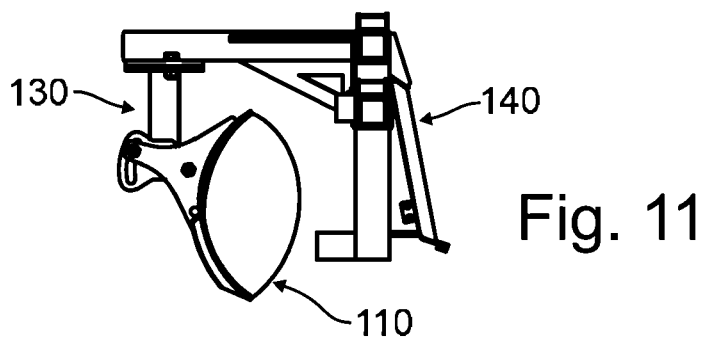
Figure 12:
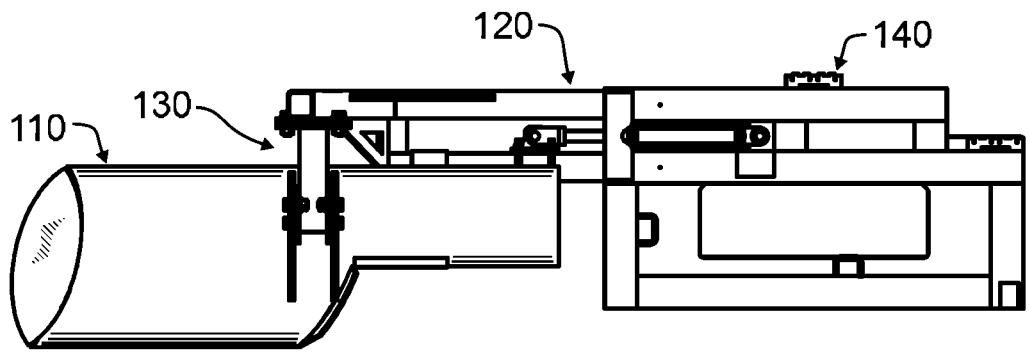

In addition, FIG. 9 illustrates the preferred embodiment stall plow 100 of FIGS. 1-4 in further combination with a skid steer. Visible therein is a prior art front end quick connect coupler 7 on a skid steer 8, to which skid steer universal coupling 140 is secured. The provision of skid steer universal coupling 140 greatly simplifies the installation of preferred embodiment stall plow 100 onto a prior art front end coupler 7, allowing an operator to quickly connect preferred embodiment stall plow 100 to skid steer 8, remove the waste bedding 5 from stall floor 4 into alley 1, then also quickly and easily disconnect preferred embodiment stall plow 100 from skid steer 8, and finally quickly couple a loader bucket or other apparatus thereto for removal of waste bedding 5 from the alley. However, in those barns that already have an automated alley cleaner such as illustrated in some of the patents incorporated herein above by reference, there will be no further work required by a person after the waste bedding has been moved into the alley, since the automated cleaner will handle removal from there.

Preferred embodiment stall plow 100 is illustrated in further combination with a skid steer in FIG. 9, and so is provided with a skid steer universal coupling 140. Nevertheless, in alternative embodiments other types of couplers that may be configured to couple to other types of driving apparatus will be provided. For exemplary and non-limiting purposes, a coupler may be provided in place of skid steer universal coupling 140 that is configured to couple to a prior art three point hitch coupler found on many tractors of various size. Other types of drive couplings that are configured to couple to other known sources of driving power will be understood to be incorporated herein.

Preferred embodiment stall plow 100 may be manufactured from a variety of materials, including metals, resins and plastics, ceramics or cementitious materials, or even combinations or composites of the above. However, it is preferable that all materials are sufficiently tough and durable to not fracture or easily abrade, even when great forces are applied thereto. In the case of preferred embodiment stall plow 100, a preferred material is carbon steel, which is extremely tough and durable to withstand great force, scuff resistant, readily fabricated, and, when required, repaired. Individual components may alternatively be fabricated from other materials. Furthermore, certain components may be designed to be replaceable, such as but not solely limited to scraper edges, without departing from the present invention.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. In combination, a free style barn, skid steer and a stall plow, said free style barn comprising:
    a stall floor having a plurality of livestock stall partitions anchored thereto;
    a curb separating said stall floor from an alley; and
    stall bedding distributed across said stall floor at least adjacent to said livestock stall partitions;
    said skid steer comprising:
    a drive apparatus; and
    a skid steer quick connect coupler;
    said stall plow comprising:
    a stall plow quick connect coupler coupled to said skid steer quick connect coupler;
    a moldboard having:
        a primary scraper section having a bottom scraper edge and configured to scrape and lift said stall bedding from said stall floor;
        a curb section coupled with and extending from said primary scraper section and having a curb bottom edge vertically displaced above said bottom scraper edge and said curb, and configured to receive said stall bedding from said primary scraper section and shift said stall bedding over said curb; and
        a discharge spreader coupled with and extending from said curb section and having a lower edge displaced above said alley and configured to receive said stall bedding from said curb section and drop and distribute said stall bedding into said alley.

2. The combination free style barn, skid steer and stall plow of claim 1, wherein said moldboard further comprises a curb flange, said curb flange adapted to withstand operative contact with said curb and to provide a seal with said curb to facilitate movement of said stall bedding across said curb.

3. The combination free style barn, skid steer and stall plow of claim 1, wherein said moldboard further comprises a side cutter extending generally perpendicular to a longitudinal axis of said moldboard and configured to operatively form a clean and sharp removal line in said stall bedding and to also operatively guide removed bedding into contact with said primary scraper section to thereby prevent formation of a ridge of removed bedding along a boundary between said stall bedding and said stall floor.

4. The combination free style barn, skid steer and stall plow of claim 1, wherein said stall plow further comprises an extensible arm coupling said moldboard to said stall plow quick connect coupler.

5. The combination free style barn, skid steer and stall plow of claim 1, wherein said skid steer further comprises a source of pressurized hydraulic fluid; and said stall plow further comprises a hydraulic extension cylinder coupled with and driven by said source of pressurized hydraulic fluid to vary a length of said extensible arm.

6. The combination free style barn, skid steer and stall plow of claim 4, wherein said stall plow further comprises an angle and pitch adjuster coupling said extensible arm to said moldboard and configured to vary both an angle and pitch of said moldboard relative to said stall floor.

7. The combination free style barn, skid steer and stall plow of claim 1, wherein said stall plow is pulled by said skid steer in a direction of travel parallel to said curb and trailing said skid steer.

\* \* \* \* \*